United States Patent [19]

Woods et al.

[11] 4,355,458
[45] Oct. 26, 1982

[54] METHOD OF MAKING AN ELECTRICAL CONTROL

[75] Inventors: Lee O. Woods, Morrison; Donald L. Haag, Sterling, both of Ill.

[73] Assignee: General Electric Company, Fort Wayne, Ind.

[21] Appl. No.: 156,845

[22] Filed: Jun. 5, 1980

Related U.S. Application Data

[62] Division of Ser. No. 940,589, Sep. 8, 1978, Pat. No. 4,237,508.

[51] Int. Cl.³ .................................... H01F 41/00
[52] U.S. Cl. ........................... 29/602 R; 310/68 R
[58] Field of Search .............. 29/596, 622, 602 R; 310/68 B, 68 C, 68 D, 68 R; 318/783–791; 361/24–31, 103, 106

[56] References Cited

U.S. PATENT DOCUMENTS

| | | | |
|---|---|---|---|
| 3,109,078 | 10/1963 | Malone et al. | 318/783 |
| 3,168,661 | 2/1965 | Rini | 310/68 R |
| 3,434,089 | 3/1969 | Waseleski, Jr. et al. | 337/40 |
| 3,586,910 | 6/1971 | Sauber | 361/24 |
| 4,042,860 | 8/1977 | Woods et al. | 361/25 |
| 4,084,202 | 4/1978 | Stoll | 361/24 |
| 4,092,573 | 5/1978 | D'Entremont | 318/783 |
| 4,161,681 | 7/1979 | Ruthje | 318/783 |
| 4,164,000 | 8/1979 | Woods | 361/27 |
| 4,175,260 | 11/1979 | Woods | 361/27 |

*Primary Examiner*—Carl E. Hall
*Attorney, Agent, or Firm*—Joseph E. Papin

[57] ABSTRACT

A method of making an electrical control having a relay device, a solid state starter device and an overload protector device predeterminately arranged therein and connected in circuit relation.

8 Claims, 9 Drawing Figures

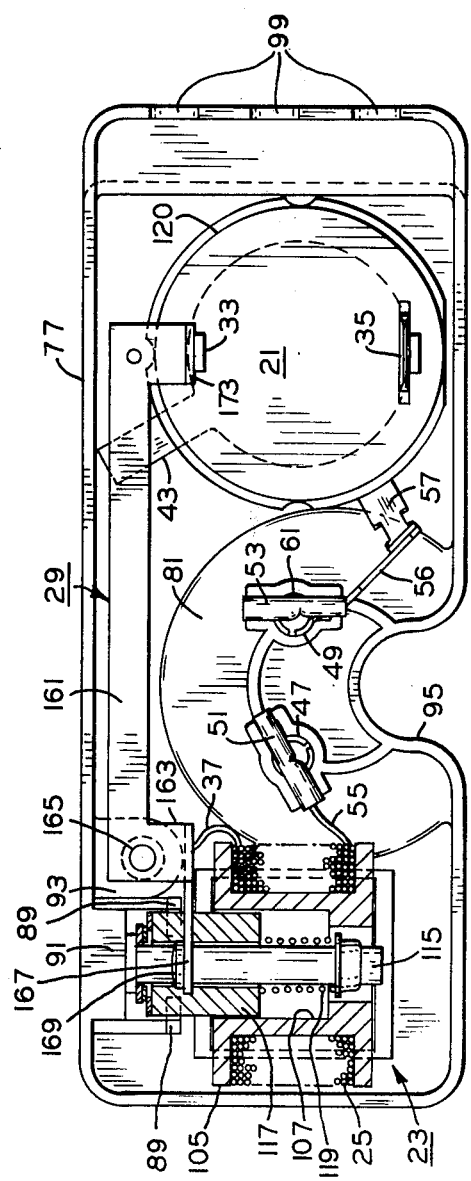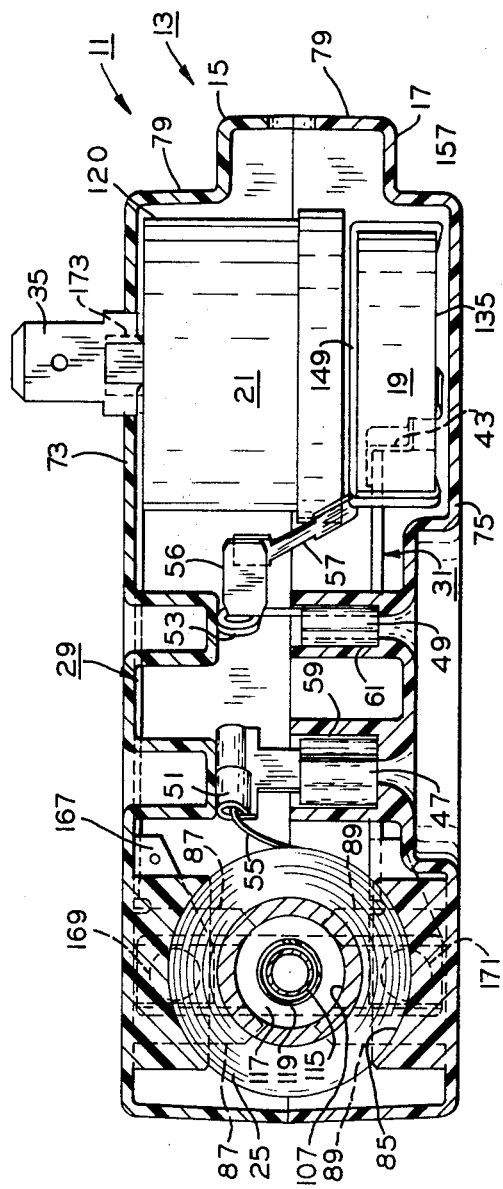

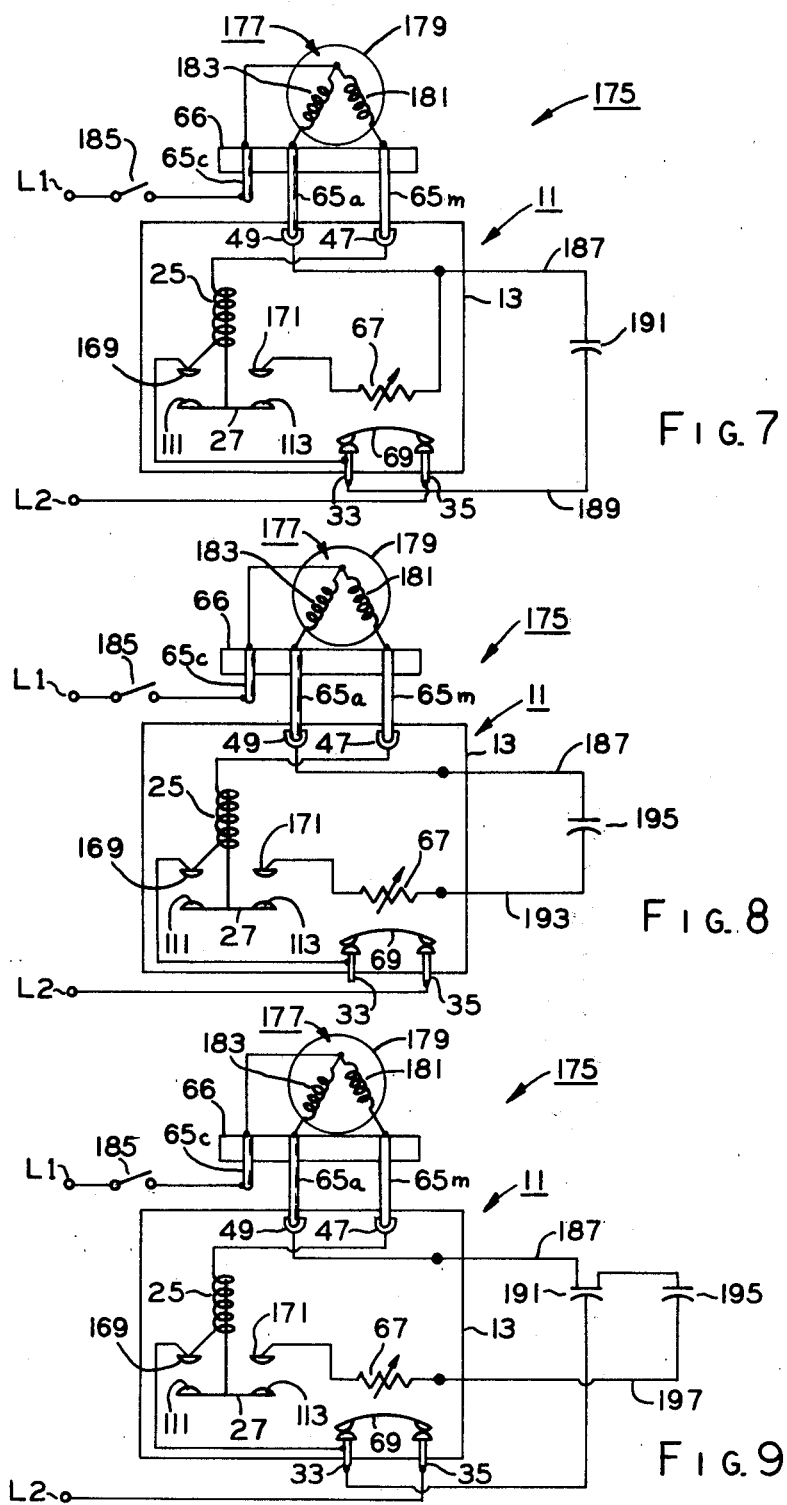

METHOD OF MAKING AN ELECTRICAL CONTROL

CROSS-REFERENCE TO RELATED APPLICATION

This application is a division of application Ser. No. 940,589 filed Sept. 8, 1978, now U.S. Pat. No. 4,237,508, which is incorporated herein by reference.

FIELD OF THE INVENTION

This invention relates in general to electrical controls and in particular to a method of making such.

BACKGROUND OF THE INVENTION

In the past, various types of electrical and/or electric-mechanical controls were utilized to control a winding circuit of a prime mover, such as for instance a dynamo-electric machine or an electric motor, with the winding circuit including main winding means and auxiliary winding means. Upon the energization of the prime mover, these past electrical controls were operable generally to effect the conjoint energization of both the main winding means and the auxiliary winding means during the starting mode operation of the prime mover, i.e., until a preselected speed thereof was attained. When the prime mover was energized to its preselected speed, the past electrical controls were operable to then render the auxiliary winding means generally ineffective in the winding circuit, and the main winding means continued to be energized during the running mode operation of the prime mover maintaining the preselected speed thereof. Of course, in the winding circuit of some prime movers, at least a part of the auxiliary winding means may be energized so as to assist the main winding means during the running mode operation of the prime mover, and capacitor means may be connected in the winding circuit in circuit relation with the main winding means and/or the auxiliary winding means.

In some of the prior art controls, when a rotatable assembly of the prime mover was energized to the preselected speed thereof, a centrifugal mechanism carried on the rotatable assembly was actuated to move an associated collar generally axially on the rotatable assembly from an at-rest position toward another position, and upon such axial movement to its another position, the collar drove linkage means for operating a switch which effected the deexcitation of the auxiliary winding means by disconnecting it from a power source. Thus, with the auxiliary winding means rendered ineffective in the winding circuit, the prime mover then was energized generally at the preselected speed during the running mode operation thereof in response to the continued excitation of the main winding means. Of course, at least one of the disadvantageous or undesirable features of the aforementioned centrifugal mechanism and associated linkage means is believed to be those well-known limitations attributable to most all mechanical devices, such as tolerance problems, wear problems, noise problems and, in some instances, reliability problems.

In another type of these prior art controls, only a current relay was employed for controlling the excitation of the auxiliary winding means. For instance, a coil of the current relay was serially connected in the winding circuit with the main winding means thereof, and contact means for the current relay was serially connected in the winding circuit with the auxiliary winding means thereof. When the prime mover was energized across the line, as previously mentioned, the coil of the current relay and the main winding means were excited, and the excitation of the relay coil effected the magnetic closure of the contact means of the relay so as to effect the excitation of the auxiliary winding means; therefore, in this manner, the main winding means and the auxiliary winding means were conjointly excited to energize the prime mover to generally to its preselected speed during a starting mode thereof. Of course, when the prime mover was so energized generally to its preselected speed, the current draw of the main winding means was appreciably reduced, and such reduction of current to a predetermined drop-out value of the relay caused the relay coil to weaken its magnetic affect thereby to permit the contact means of the current relay to return to their at-rest or open position. Thus, with the relay contacts so opened to interrupt current flow to the auxiliary winding means, the auxiliary winding means was rendered ineffective generally at the time the prime mover attains its preselected speed, and the prime mover remained energized generally at the preselected speed thereof during its running mode operation in response to the continued excitation of the main winding means. At least one of the disadvantageous or undesirable features of such past prime movers utilizing only a current relay for controlling excitation of the auxiliary winding means is believed to be that the contact means of the current relay had a tendency to weld in response to the generally large current draw by the auxiliary windings during the starting operation of the prime mover. Another disadvantageous or undesirable feature is believed to be that the current relay may have generated radio and television interference at the instant of make and break due to arcing of the contact means.

Another one of the prior art electrical controls for controlling the excitation of the auxiliary winding means was a positive temperature coefficient resistor (PTCR) which was connected in series with the auxiliary winding of the prime mover. When the prime mover was energized across the line, the main winding means and auxiliary winding means were initially conjointly excited since the PTCR exhibited little initial resistance to current flow to the auxiliary winding means. The PTCR acts generally as a low value resistor until its internal temperature reaches its "Curie" point or anomoly temperature at which time its resistance increases abruptly along with an increase of its temperature. Therefore, the temperature of the PTCR was increased in response to current flow therethrough to the auxiliary winding means during the starting operation of the prime mover, and generally at the time the prime mover attained its preselected speed, the resistance of the PTCR abruptly increased to a value appreciably limiting current flow therethrough. Thus, the auxiliary winding means was, in fact, rendered generally ineffective in the winding circuit generally at the time the prime mover attained its preselected speed, and the prime mover remained energized generally at the preselected speed thereof in response to the continued excitation of the main winding means. Of course, so long as the PTCR was energized, it remained "hot" exhibiting a high resistance to current flow, and it is believed that, under certain conditions, this may be a disadvantageous or undesirable feature. For instance, if for some reason the prime mover had not been energized to the preselected speed so that the torque of the main winding means alone would sustain such preselected speed, then the prime mover would stall to zero speed and remain there since the PTCR would, in effect, block current flow to the auxiliary winding means. If the overload protection system of the prime mover did not alleviate the aforementioned stalled condition or locked rotor condition of the prime mover or if such overload protection system did not reset itself before the PTCR had time to cool, this stalled condition of the prime mover would be perpetuated.

A combination relay and PTCR type electrical control is disclosed in the Lee O. Woods copending application Ser. No. 829,276 filed Aug. 31, 1977 (now U.S. Pat. No. 4,164,000 issued Aug. 7, 1979) which is incorporated herein by reference, and a combination PTCR—overload protector device is disclosed in U.S. Pat. No. 4,042,860 issued Aug. 16, 1977 which is also incorporated herein by reference. Further, the William C. Rathje application Ser. No. 778,335 filed Mar. 17, 1977 (now U.S. Pat. No. 4,161,681 issued July 17, 1979) and assigned to the General Electric Company illustrates a prime mover having a relay device, an overload protector and a PTCR connected in circuit relation therewith, and this application is also incorporated by reference herein.

SUMMARY OF THE INVENTION

Among the several objects of the invention may be noted the provision of an improved method of making an electrical control which overcomes at least some of the above discussed disadvantageous or undesirable features as well as others, of the prior art; the provision of such improved method in which a relay device, a solid state starter device and an overload protector device are associated with each other so as to compensate for at least some of the inherent limitations of such devices; the provision of such improved method in which vibrational torque stressing of a plurality of terminal means supported in the electrical control is at least minimized when such terminal plurality is assembled onto respective male terminals of a clustered plurality thereof which may be subjected to vibration; and the provision of such improved method in which the components thereof are simplistic in design, easily assembled and/or interconnected, and economically manufactured. These as well as other objects and advantageous features of the invention will be in part apparent and in part pointed out hereinafter.

In general, a method in one form of the invention is provided for making an electrical control having a housing with a chamber therein and with at least a pair of openings predeterminately clustered in spaced relation with respect to each other in the housing and communicating with the chamber. In this method, a pair of female terminals is connected in circuit relation with a solid state starter device, an overload protector device and a relay device. The female terminal pair is disposed in the at least opening pair, and the solid state starter device, the overload protector device and the relay device are arranged in the chamber with respect to the female terminal pair so that the respective centers of gravity of the relay device, the solid state starter device and the overload protector device are generally balanced about the female terminal pair.

Further in general, an electrical control has: a pair of housing parts; a starter device; a relay device having coil means and armature means adapted for magnetic coupling relation therewith; an overload protector device; and a pair of contact members. A method in one form of the invention for making the electric control includes the following steps: mounting to one of the housing parts one of the contact members with the overload protector and the coil means respectively connected in circuit relation therewith; mounting to the other of the housing parts the other of the contact members with the starter device connected in circuit relation therewith; and assembling the housing parts together in an assembly position with the starter device and the overload protector disposed at least adjacent each other and with the contact members positioned for contacting engagement with the armature means of the relay device and caging the coil means of the relay device between the housing parts.

BRIEF DESCRIPTION OF THE INVENTION

FIG. 2 is an enlarged partial sectional of the electrical control of FIG. 1 with a part of the housing thereof removed;

FIG. 3 is an enlarged sectional view taken along line 3—3 of FIG. 2;

FIGS. 6-9 are schematic diagrams illustrating different circuitry for the electrical control of FIG. 1.

Corresponding reference characters indicate corresponding parts throughout the several views of the drawings.

The exemplifications set out herein illustrate the preferred embodiments of the invention in one form thereof, and such exemplifications are not to be construed as limiting the scope of the disclosure of the invention in any manner.

DETAILED DESCRIPTION OF THE PREFERRED EMBODIMENTS

Figure 1:
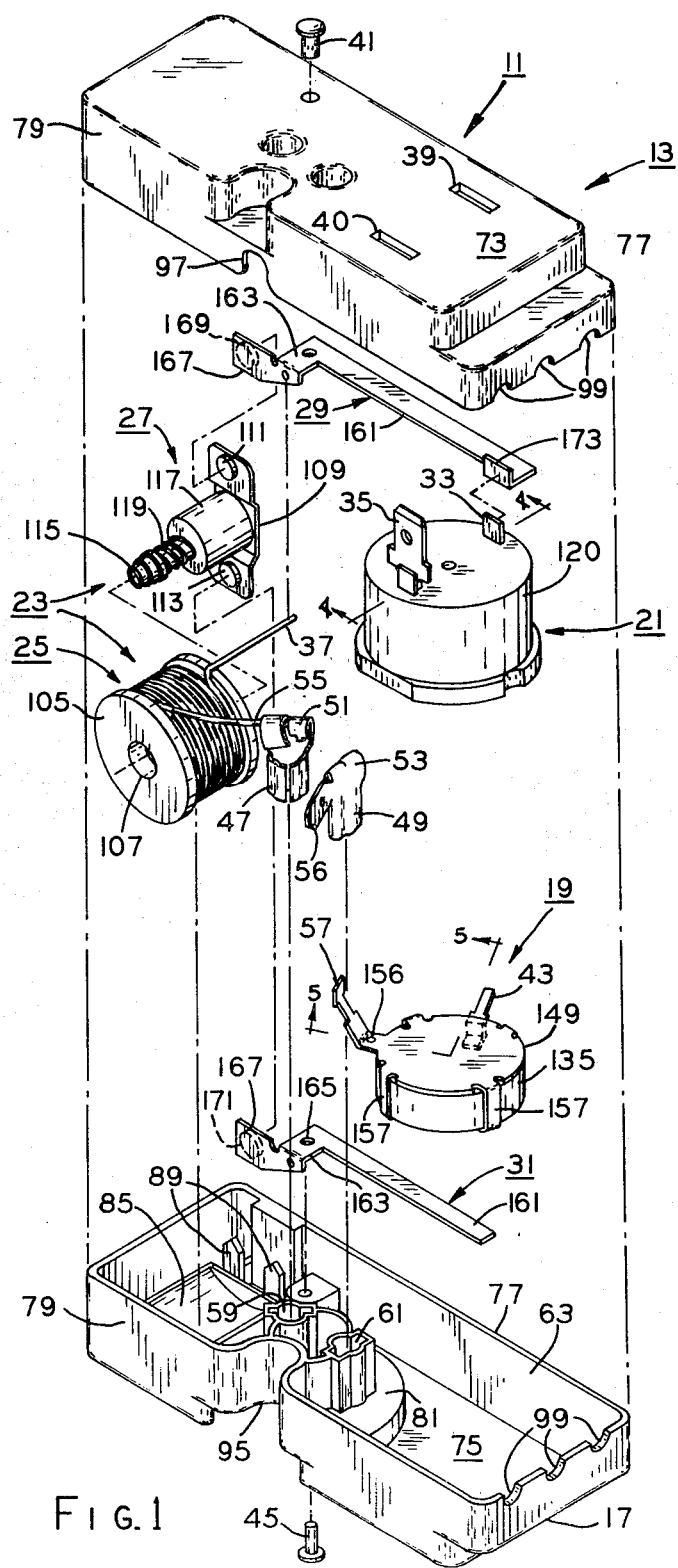
FIG. 1 is an exploded perspective view showing an electrical control and illustrating principles which may be utilized in a method of making an electrical control also as one form of the invention.

Referring now to the drawings in general, a method in one form of the invention is provided for making or assembling an electrical control or device 11 (FIGS. 1-3). Electrical control 11 has a housing 13 comprising a pair of housing parts, such as a cover 15 and a base 17, which enclose, at least in part, a plurality of electrical components including: a solid state starter device 19; an overload protector device 21; a relay device 23 having a coil means 25 and a switch means 27 adapted for magnetic coupling relation therewith; and a pair of contact members 29, 31 (FIG. 1). In practicing the aforementioned method, contact member 29 having overload protector device 21 and coil means 25 respectively connected in circuit relation therewith is mounted or otherwise secured to or supported on housing cover 15 (FIGS. 1 and 3). Contact member 31 having starter device 19 connected in circuit relation therewith is mounted or otherwise secured to or supported on housing base 17 (FIGS. 1 and 3). Thereafter, housing cover 15 and housing base 17 are assembled together in an assembly position with starter device 19 and overload protector 21 disposed at least adjacent each other and with contact members 29, 31 positioned or otherwise arranged for contacting engagement with switch means 27 of relay device 23, and coil means 25 of the relay device is caged or otherwise mounted or supported between the housing base and the housing cover (FIGS. 1-3).

More particularly and with specific reference to FIG. 1, overload protector device 21 is provided with a plurality of terminal means, such as for instance at least terminal pair 33, 35. Terminal 33 and a free or opposite connection end 37 of coil means 25 are respectively connected in the aforementioned circuit relation with contact member 29 by suitable means, such as for instance welding, soldering or a mechanical gripping engagement or the like. Thereafter, contact member 29 and overload protector 21 may be predeterminately located within housing cover 15 with terminals 33, 35 of the overload protector extending through a pair of means, such as slots or openings 39, 40 in the housing cover for receiving the terminals so that such terminals extend or are disposed at least in part exteriorly of the housing cover, and when so predeterminately located, the contact member is mounted or otherwise secured generally against displacement movement to the housing cover by a suitable securing means, such as a rivet 41 or the like for instance. Of course, it is contemplated that slot 39 in housing cover 15 may be omitted so that contact member 29 and contact 33 of overload protector device 21 are, when interconnected with each other, disposed within housing 13 within the scope of the invention so as to meet the objects therefor. A tab or terminal 43 of starter device 19 is also connected in the aforementioned circuit relation with contact member 31 by suitable means, such as soldering or welding or the like for instance, and the contact member and the starter device may be predeterminately located within housing base 17. When contact member 31 and starter device 19 are so predeterminately located, the contact member is mounted or otherwise secured generally against displacement movement to housing base 17 by suitable securing means, such as a rivet 45 or the like for instance. Of course, it is contemplated that either one of contact members 29, 31 may be connected with their respective components and also mounted to housing cover and base 15, 17 as discussed above, either prior to or simultaneously with the other of the contact members within the scope of the invention so as to meet the objects thereof.

Electrical control 11 is provided with a plurality of clustered terminal means, such as at least female terminal pair 47, 49, which have electrical connector sections 51, 53 integrally formed therewith, respectively. Electrical connector section 51 of female terminal 47 is connected to another free or opposite connection end 55 of coil means 25 by suitable means, such as for instance soldering, welding, crimping or other mechanical gripping engagement or the like for instance, and electrical connection section 53 of female terminal 49 is provided with an integral extension or tab 56 which is connected with another tab or terminal means 57 of starter device 19 by suitable means, such as welding or soldering for instance. Of course, these above discussed connections of female terminal electrical connector sections 51, 53 may be made either before coil means 25 and starter device 19 are connected in the aforementioned circuit relation with contact members 29, 31 or after the contact members are mounted to housing cover and base 15, 17 within the scope of the invention so as to meet the objects thereof. Furthermore, although female terminals 47, 49 are shown herein for purposes of disclosure, it is contemplated that other types of terminals having various other configurations and electrical connector sections may be utilized in electrical control 11 within the scope of the invention so as to meet the objects thereof.

A plurality of means, such as at least an opening or aperture pair 59, 61 for instance, for receiving or seating female terminals 47, 49 is provided through housing base 17 with the openings being predeterminately located therein and arranged or clustered in predetermined spaced relation. Thus, in one embodiment of the invention, when female terminal 49 is connected to tab 57 of starter device 19, the female terminal may be inserted or otherwise placed into opening 61 simultaneously with the aforementioned location of the starter device and contact member 31 within housing base 15. Further and prior to the assembly of housing cover and base 15, 17, female terminal 47 which is secured to opposite connection end 55 of coil means 25 may be inserted or otherwise placed into opening 59 of the housing base. When housing cover and base 15, 17 are assembled together into an assembly position, as shown in FIGS. 2 and 3, starter device 19 and overload protector device 21 are disposed at least adjacent each other in heat transfer relation, and contact members 29, 31 are positioned for contacting engagement with switch means 27 of relay device 23. Further, coil means 25 of relay device 23 is also caged or otherwise gripped generally against displacement movement between housing base and cover 15, 17 so as to generally maintain switch means 27 which is movably arranged in the coil means in alignment with contact members 29, 31. Of course, when housing cover and base 15, 17 are so arranged in their respective assembly positions, they may be interconnected to each other against displacement by suitable securing means, such as for instance heat sealing or a mechanical connection for instance.

Referring again to the drawings in general and recapitulating at least in part with respect to the foregoing, another method in one form of the invention is disclosed for making electrical control 11 wherein housing 13 has a chamber 63 therein with openings 59, 61 communicating with the chamber (FIGS. 2 and 3). In this method, female terminals 47, 49 are connected in circuit relation with starter device 19, overload protector device 21 and relay device 23, as discussed above (FIG. 1). Female terminals 47, 49 are then disposed in openings 59, 61, and starter device 19, overload protector device 21 and relay device 23 are arranged or otherwise positioned in chamber 63 with respect to the female terminals so that the respective centers of gravity of the starter device, the overload protector device and the relay device are generally balanced or evenly distributed about the female terminals (FIGS. 2 and 3).

Electrical control 11 is adapted for assembly onto at least some predeterminately spaced apart male terminals 65 of a clustered plurality thereof, such as for instance in a Fusite plug 66 or the like, which may be subjected to vibration depending, of course, on the type of apparatus (not shown) with which the male terminals may be associated in circuit relation (FIGS. 6-9). Electrical control 11 is provided with predeterminately spaced apart female terminals 47, 49 disposed in housing 13 and adapted for releasably receiving in electrical contacting engagement respective ones of male terminals 65 when the electrical control is assembled there-onto (FIGS. 1–3). Starter device 19, overload protector device 21 and relay device 23 are connected in circuit relation with each other in housing 13 and are predeterminately mounted or otherwise supported in spaced relation in the housing with respect to female terminals 47, 49 so that the centers of gravity of the starter device, the overload protector device and the relay device are generally balanced or otherwise evenly distributed about the female terminal thereby to alleviate or at least limit vibrational torque stressing of the female terminals in the event of the occurrence of the aforementioned vibrations of male terminals 65 when electrical control 11 is assembled thereon (FIGS. 2, 3 and 6–9).

Figure 5:
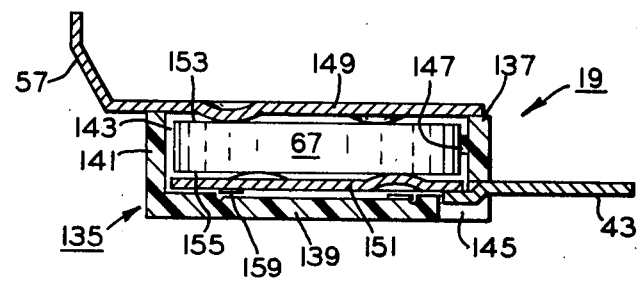
FIG. 5 is an enlarged sectional view taken along line 5—5 of FIG. 1 showing a solid state starter device of the electrical control in cross-section.

Further, electrical control device 11 in one form of the invention is provided with housing 13 having chamber 63 therein, and a positive temperature coefficient resistor (PTCR) 67 in the chamber is operable generally at its anomoly or Curie point temperature to generally impede or throttle current flow therethrough when energized (FIGS. 1–3 and 5). Current relay device 23 in chamber 63 includes coil means 25 adapted for energization and having a predetermined current drop-out value, and switch means 27 is arranged in magnetic coupling relation with the coil means and in circuit relation with PTCR 67 for controlling the energization thereof (FIGS. 1 and 5). PTCR 67 is adapted to be energized generally conjointly with coil means 25, and switch means 27 is adapted to be operable generally in response to the occurrence of the predetermined current drop-out value to effect the interruption of the energization of the PTCR (FIGS. 6–9). A thermally responsive current carrying switch or switching means 69 in chamber 63 is disposed or otherwise located or positioned generally adjacent PTCR 67 for heat transfer relation therewith and is also connected in circuit relation with coil means 25, and switch means 69 is operable generally in response to a preselected condition to effect the deenergization of relay device 23 (FIGS. 5–9).

More particularly and with specific reference to FIGS. 1–3, housing 13 has a plurality of wall means 71 including a pair of opposed base walls 73, 75 integrally formed with sidewalls 77, 79 on housing cover and base 15, 17 which, when fitted together in the assembly position of the housing base and cover, as previously described, define chamber 63 within the housing. Base wall 75 of housing base 17 is provided with a mounting hub 81 generally interposed between opposite sides or portions of chamber 63. At least opening pair 59, 61 are provided through the mounting hub so as to communicate with the chamber, and female terminals 47, 49 are seated in the opening pair so as to releasably receive respective ones of male contacts 65 when electrical device 11 is mounted thereon, as discussed hereinafter. While housing 13 is shown containing female terminals 47, 49, it is contemplated that a housing may be utilized containing a cluster of more than two female terminals in predetermined spaced relation within the scope of the invention so as to meet the objects thereof. A pair of means, such as cradles 83, 85 for instance, are integrally formed or otherwise disposed on base walls 73, 75 of housing base and cover 15, 17 in opposed relation with each other for gripping, positioning or displacement preventing engagement with coil means 25 of relay device 23, and a pair of means, such as guides or seats 87, 89 are also integrally formed or otherwise disposed on the base walls for guiding or sliding engagement with switch means 27 of the relay device, respectively. Of course, an adjacent one of sidewalls 77, 79 may be utilized as a stop for switch means 27, or if desired, an integral abutment 91 may be provided on housing 13 to serve as such stop. A mounting base or seat 93 is also provided on base wall 75 of housing base 17 so as to be arranged generally adjacent cradle 85, and contact member 31 is mounted or secured on seat 93 by rivet 45 attached to the housing cover while contact member 29 is secured to base wall 73 of the housing cover, as previously mentioned. Sidewall 79 of housing base 17 is indented at 95 in order to accommodate a respective one of male terminal 65, such as a common terminal, and a lead opening 97 is provided in sidewall 77 of housing cover 15 generally adjacent the indentation 95 to accommodate a lead or circuit means (not shown) adapted for connection to such common male terminal when electrical device 11 is mounted to male terminal 65. If desired, a plurality of other lead openings, such as those shown at 99 for instance, may be provided in at least one of the adjacent sidewalls 77, 79 of housing cover and bases 15, 17 so as to accommodate other leads or circuit means which may be connected in circuit relation with the electrical components of electrical control 11, as discussed hereinafter.

Coil means or relay coil 25 comprises a plurality of turns of dielectrically coated wire wound about a spool or bobbin 105 of suitable dielectric material having a stepped bore 107 extending generally axially therethrough, and the opposite free ends or lead parts 37, 55 of the coil means are connected in circuit relation with contact member 29 and female terminal 47, as previously mentioned. When relay device 23 is mounted or otherwise supported in housing 13, bobbin 105 is caged or seated between cradles 83, 85 on housing base and cover 15, 17 so as to be gripped or otherwise positioned against displacement movement in chamber 63.

Switching means 27 comprises means, such as a bridge 109, for bridging or electrical contacting engagement between contact members 29, 31 and the bridging means or bridge carries a pair of contacts 111, 113. Bridge 109 is carried adjacent the lower end of a pin 115, and an armature means or member, such a plunger 117 of suitable magnetic material, is slidably received about the pin which extends into stepped bore 107 of bobbin 105. Armature member 117 is disposed or guided in at least a part of stepped bore 107 of bobbin 105 so as to be arranged in magnetic coupling relation with coil means 25 upon the energization thereof, and the armature member is also slidably received in guided engagement between opposed guides 87, 89 of housing cover and base 15, 17. Resilient means, such as a coil spring 119, is caged or otherwise retained between armature member 117 and the upper end of pin 115 generally within stepped bore 107 of bobbin 105. Thus, in an at rest or circuit interrupting position of switching means 27, the compressive force of spring 119 and the weight of armature member 117 acting on bridge 109 urges it toward a position breaking its contacts 111, 113 from contact members 29, 31. Of course, relay 23 is representative of various types of relays which may be employed in electrical control 11, and it is contemplated that other relay constructions may be utilized within the scope of the invention so as to meet the objects thereof.

Figure 4:
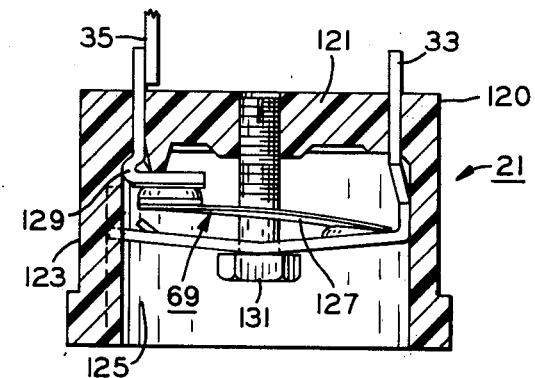
FIG. 4 is an enlarged sectional view taken along line 4—4 of FIG. 1 showing an overload protector device of the electrical control in cross-section.

Overload protector device 21 may be a model 3ARG11 available from the General Electric Company, Morrison, Illinois, as shown in FIGS. 1 and 4, and includes a casing 120 having a base wall 121 integrally connected with a sidewall 123 so as to form a recess 125 therebetween. Terminals 33, 35 of overload protector device 21 may be integrally molded or otherwise secured with base wall 121 so as to extend therethrough, and thermally responsive current carrying switch means 69 which includes a bimetal or switching element 127 is carried on an interior end portion of terminal 33 within recess 125 for circuit making and breaking engagement with the interior end portion of terminal 35 within the recess which defines a contact 129. Means, such as an adjustment screw 131, is threadedly received on base wall 121 of casing 120 and is operable generally for adjustably urging or biasing switch means 69 toward circuit making engagement with contact 129 thereby to adjustably predetermined the trip force of the switch means. Thus, switch means 69 may be operated from the circuit making position thereof engaged with contact 129 toward its circuit breaking or interrupting position in response to a preselected condition, such as the occurrence of an over current condition generating enough heat to effect the operation of the switch means. Albeit not shown, it is contemplated that another terminal may be provided through base wall 121 of casing 120 along with a heating element for switch means 69 in recess 125 within the scope of the invention so as to meet the objects thereof. If a more detailed discussion of the construction or operation of overload protector device 21 is desired, reference may be had to U.S. Pat. No. 2,771,528 issued to D. E. Moran on Nov. 20, 1956 which is incorporated herein by reference. Of course, overload protector device 21 is merely representative of various types of overloads which may be employed in electrical control 11, and it is contemplated that other overload protector devices of different constructions may be utilized within the scope of the invention so as to meet the objects thereof.

With reference to FIG. 5, starter device 19 is provided with a casing 135 which has a plurality of wall means including a pair of generally opposite end walls 137,139 integrally interconnected by a sidewall 141 so as to generally define a recess or recess means 143, and the recess intersects with end wall 137 so as to be generally open-ended. An opening 145 is provided through at least one of end wall 139 and sidewall 141 of casing 135 so as to intersect with recess means 143 generally adjacent end wall 139, and a plurality of abutments 147 may be integrally provided on the sidewall within the recess for spacing or locating engagement with PTCR 67.

A pair of means, such as contact plates 149, 151, for electrical contacting and supporting engagement with PTCR 67 are illustrated for purposes of disclosure as having a generally round or circular shape, but it is contemplated that other contact plates having various other shapes or configurations may be utilized within the scope of the invention so as to meet the objects thereof. Plate 151 is disposed generally closely adjacent or in overlaying relation with casing end wall 139 within recess 143, and tab 43, which may be integral with plate 151 or connected thereto by suitable means, such as soldering or welding for instance, so as to extend therefrom, is positioned or located so as to protrude through opening 145 in casing 135 exteriorly thereof when the plate is positioned or located within recess 143.

PTCR 67 is generally cylindric in shape and operable generally in response to current flow therethrough to vary or increase its resistance generally as a function of its temperature so as to generate heat when energized, and of course, a pair of opposite sides 153, 155 of PTCR 67 are coated or otherwise covered or layered with a chemical composition (not shown) so as to insure the generally even or constant flow or distribution of current through the PTCR from one of the opposite sides to the other thereof. In this manner, PTCR 67 is embraced, i.e., supported or positioned in both the electrical contacting and positioning or supporting engagement between contact plates 149, 151 within recess 143 of casing 135. While PTCR 67 is shown having a generally cylindric shape, it is contemplated that a PTCR having a shape other than cylindric may be employed within the scope of the invention so as to meet the objects thereof.

Plate 149 is arranged with or disposed on end wall 137 of casing 135 so as to at least in part close recess 143 with the plate engaging contact side 153 of PTCR 67 within the recess, and tab 57, which may be integral with plate 149 or connected thereto by suitable means, such as soldering or welding for instance, is located exteriorly of casing 135. If desired, a welding opening 156 may be provided through tab 57 of plate 149 in order to enhance connection, such as by welding, soldering or other suitable means, thereto of various other circuit means or leads, as discussed hereinafter. With plate 149 so associated with casing 135, as described above, a plurality of straps 157 integral with the plate may then be bent or otherwise deformed away from the plane of the plate generally about casing 135 and into releasably securing or gripping engagement therewith so as to prevent the displacement of the plate from casing end wall 137 and to maintain PTCR 67 against displacement from recess 143. In other words, straps 157 are initially bent away from the plane of plate 149 so as to extend generally in overlaying relation with casing sidewall 141 at least closely adjacent thereto exteriorly of casing 135, and the distal or free ends or portions of the straps are thereafter bent or otherwise deformed so as to overlay casing end wall 139 in the aforementioned holding, gripping or releasably securing engagement therewith. To complete the description of starter device 19, means, such as a wavy washer type spring 159 or the like, may be associated with plate 151 and casing end wall 139 within recess 143 for resiliently urging plate 151 toward its electrical contacting engagement with contact side 155 of PTCR 67 and contact side 153 thereof toward its electrical contacting engagement with plate 149. If a more detailed discussion of the construction, operation, or method of assembly of starter device 19 is desired, reference may be had to copending application Ser. No. 829,276 filed Aug. 31, 1977 which, as previously mentioned, is incorporated herein by reference. Of course, starter device 19 is merely representative of various different types of starter devices which may be employed in control device 11, and it is contemplated that other starter devices of different constructions may be utilized within the scope of the invention so as to meet the objects thereof.

Contact members 29, 31 may be stamped or otherwise formed from sheet material having good electrical conductive properties, such as beryllium copper for instance. Contact member 29, 31 are provided with a pair of generally L-shaped legs 161, 163 having a mounting opening or aperture 165 therethrough generally adjacent the juncture of the legs, and a depending tab or foot 167 is integrally formed with legs 163, respectively. A pair of contacts 169, 171 are respectively provided on depending tabs 167 of each contact member 29, 31 which are adapted for making and breaking engagement with bridge 109 of switch means 27 of relay device 23, as discussed in greater detail hereinafter. If desired, weld openings may be provided through contact members 29, 31 in order to enhance the welding thereto of the various conductors, leads or terminals. Leg 161 of contact member 29 has an additional welding tab 173 integrally formed adjacent the free end thereof which is fixedly connected by suitable means, such as welding or soldering, to terminal 33 of overload protector device 21 so as to at least in part extend therewith through opening 39 in housing cover 15 exteriorly thereof. While the particular constructions of contact members 29, 31 are shown for purposes of disclosure, it is contemplated that other contact members having various other configurations may be employed in electrical control 11 within the scope of the invention so as to meet the objects thereof. When contact members 29, 31 are respectively mounted to housing base and cover 15, 17, as previously mentioned, contact member legs 163 are abutted against seat 93 therefor on the housing base and against the housing cover so that rivets 41, 45 extend through mounting openings 165 of the contact members thereby to effect the predetermined location of the contact members and electrical components connected therewith within the housing base and cover, respectively. With contact members 29, 31 so predeterminately located in housing base and cover 15, 17, it may be noted that contacts 169, 171 of the contact members are also predeterminately arranged or otherwise positioned for contacting engagement with contact pair 111, 113 of switch means 27 in relay device 23 when the housing base and cover are assembled together in their assembly positions, as previously described. Further, with contact members 29, 31 predeterminately located in housing cover and base 15, 17, it may also be noted that casings 121, 135 of overload protector device 21 and starter device 19 are disposed at least generally adjacent each other so that PTCR 67 of the starter device is arranged in heat transfer relation with switch means 69 of the overload protector device when housing base and cover 15, 17 are assembled together in their respective assembled positions, as previously discussed. In addition to the foregoing, it may also be noted that circuit means including at least contact members 29, 31 is disposed at least in part within chamber 63 of housing 13 for connecting overload protector device 21 and relay device in circuit relation with female terminal 49 and for connecting starter device 19 in circuit relation with the relay device and female terminal 49.

Figure 6:
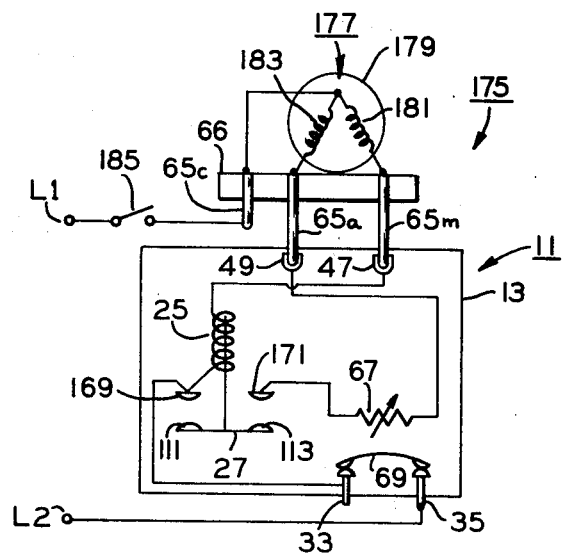

As shown in FIG. 6, electrical control 11 is connected in an exemplary circuit 175 between a power source illustrated by line terminals L1, L2 and an exemplary winding circuit 177 of a prime mover, such as for instance a dynamoelectric machine or electric motor 179 which may be of the resistance-start induction-run type. Winding circuit 177 includes at least a main or run winding means 181 and at least a start or auxiliary winding means 183 parallel connected with each other to a common male terminal 65c of male terminal plurality 65 and also respectively connected with main and auxiliary male terminals 65m, 65a of the male terminal plurality. Male terminal 65c is connected through a motor start or on-off type switch 185 to one side of a power source illustrated by a line terminal L1, and the other side of the power source, i.e. a line terminal L2, is connected with terminal 35 of electrical control 11. Of course, when electrical control 11 is mounted in plug-on relation with Fusite plug 66 male terminals 65a, 65m thereof are respectively releasably received in electrical contacting engagement by female terminals 49, 47 of the electrical control.

In the operation of electrical device 11 in exemplary circuit 175, switch 185 may be closed thereby to make the circuit across power source or line terminals L1, L2 so as to effect the initial excitation of main and auxiliary winding means 181, 183 in the starting mode operation of motor 179. In one excursion of the power through circuit 175, current may flow from line terminal L1 through common male terminal 65c of Fusite plug 66 to main and auxiliary winding means 181, 183 in winding circuit 177 of motor 179. From main winding means 181, the current flows through male terminal 65m to female terminal 47 of electrical control 11, coil means 25 of relay device 23, contact member 29, and terminal 33, switch means 129 and terminal 35 of overload protector device 21 to line terminal L2. Of course, upon the initial excitation of main winding means 181 in response to current flow during the starting mode operation of motor 179, a generally high current draw is occasioned, and when such current draw excites coil means 25 of relay device 23 to a predetermined or preselected pick-up value therefor, the coil means magnetically effects movement of its associated armature member 117 in a direction to conjointly move bridge 109 toward a position making contacts 111, 113 thereof with contacts 169, 171 on contact members 29, 31, respectively. Thus, when relay device 23 is so energized to effect the closure of its contacts 111, 113 with contacts 169, 171 of contact members 29, 31, current may also flow through auxiliary winding means 183 and male terminal 65a to female terminal 49. The current also flows through contact plate 149, PTCR 67 and contact plate 151 of starter device 19 to contact member 31 and therefrom through the closed contacts 111, 113 and 169, 171 of relay device 23 and contact members 29, 31, respectively, back to line terminal L2 through overload protector device 21, as previously described. In this manner, motor 179 is energized in its starting mode operation through electrical control 11 across line terminals L1, L2 so as to initially effect the generally simultaneous excitation of both main and auxiliary winding means 181, 183.

During the starting mode operation or starting time period of motor 179, i.e. the period of time consumed in bringing the motor up to its preselected running speed, PTCR 67 of starter device 19 is energized by the current draw through auxiliary winding means 183 of the motor, as previously described. Generally, about the time motor 179 attains its preselected running speed, i.e. generally at the end of the starting time period of the motor, PTCR 67 self-heats to its anomoly or Curie-point temperature which, of course, causes an increase in the resistance of the PTCR so as to inhibit or throttle the current flow therethrough. In this manner, the inhibiting of the current flow by PTCR 67 generally as motor 179 attains its preselected speed renders auxiliary winding generally ineffective in winding circuit 177 of the motor. Thereafter, motor 179 is energized in the running mode operation thereof generally at its preselected speed across line terminals L1, L2 in response to the continued excitation of main winding means 181 in circuit relation with the line terminals.

Upon the translation of motor 179 from its starting mode operation to the running mode thereof, as discussed above, an appreciable reduction of the current drawn by main winding means 181 is occasioned. This current draw reduction is a preselected or predetermined condition which is, in effect, sensed by coil means 25 of relay device 23, and when the current draw is so reduced to a predetermined drop-out value of the relay device, the aforementioned magnetic affect and excitation of the coil means is correspondingly reduced thereby to also reduce the magnetic coupling relation of the coil means with its associated switch means 27. In response to this reduction in the magnetic coupling of coil means 25 and switch means 27, the compressive force of spring 119 and the the mass of armature member 117 is effective to drive or return the switch means toward its at-rest position breaking relay contacts 111, 113 from contacts 169, 171 on contact members 29, 31. Upon this reopening of relay contacts 111, 113, PTCR 67 of starter device 19, is, of course, deenergized which not only alleviates any voltage drop thereacross but also permits it to cool in anticipation of a subsequent starting operation of motor 179.

In the event of the occurrence of a current overload condition in circuit 175 during the above described energization of motor 179 which may have a deleterious affect on the motor, the overload current flowing through switch means 69 of overload protector device 21 heats the switch means causing it to move from its at-rest or circuit making position engaged with terminal 13 toward its circuit breaking or interrupting position disengaged from terminal 33. Upon such thermal engendered movement of switch means 69 to its circuit interrupting position, circuit 175 is opened across line terminals L1, L2 which of course, effects the deenergization of motor 179 and also of the energized component parts of electrical control 11. After a preselected period of time, switch means 69 cools and moves or snaps into re-engagement with its cooperating terminal 33 thereby to remake circuit 175 across line terminals L1, L2 which, of course, effects the reenergization of motor 179 and the component parts of electrical device 11. However, if the overload condition still exists in circuit 175, then switch means 69 will again sense the presence thereof, i.e. again be heated in response to the overload current flowing through the switch means, and act to again open circuit 175 across line terminals L1, L2, as previously described. So long as the overload condition exists, switch means 69 will be thermally cycled to open and close circuit 175, but the length of time overload protector device 21 closes the circuit is predeterminately of a generally short duration wherein motor 179 and the components of electrical control 11 are not deleteriously affected by the current of the overload condition. Of course, PTCR 67 of starter device 19 is energized during the aforementioned cyclical closures of circuit 175 by overload protector device 21 under the aforementioned preselected or current overload condition, and the heat generated by the PTCR upon such energization thereof is transferred to switch means 69 of overload protector device 21 so as to increase the overall "off-time" thereof, i.e. increases the overall time the switch means cycles circuit 175 open across line terminals L1, L2 during the period of time the overload condition exists. If a more detailed discussion of the operation of overload protector device in combination with starter device 19 is desired reference may be had to the aforementioned applications Ser. No. 829,276 filed Aug. 31, 1977 and/or Ser. No. 778,335 filed Mar. 17, 1977.

Of course, electrical control 11 may also be employed with a motor 179 of types other than the resistance-start induction run type in circuit 175. For instance when motor 179 is of the resistance-start capacitor-run type, a pair of leads or circuit means 187, 189 may be connected with electrical control 11 across a run capacitor 191, as shown in FIG. 7. In this alternative connection of electrical control 11, lead 187 may be connected with welding opening 156 in tab 57 of starter device 19 and led through one of openings 99 therefor in housing cover and base sidewalls 77, 79 exteriorly thereof to capacitor 191, and lead 189 may be connected to contact member 29 and led through another of openings 99 therefor exteriorly of housing 13 to capacitor 191.

As shown in FIG. 8, when motor 179 is of the capacitor-start induction-run type and connected in circuit 175 with electrical control 11, lead 187 may be connected in the same manner as discussed above in FIG. 7; however, tab 57 is trimmed off so that it may not be connected with weld tab 56 of female terminal 49. Another lead 193 is connected with electrical connector section 53 of female terminal 49 in electrical control 11 and led exteriorly thereof through a respective one of openings 99 therefor in housing 13. Lead 187 and 193 connect across a start capacitor 195.

In FIG. 9, when motor 179 is of the capacitor-start capacitor-run type and connected in circuit 175 with electrical control 11, leads 187, 189 may be connected with the electrical control and across run capacitor 191 in the same manner as discussed above in FIG. 7; however, tab 57 of starter device 19 is trimmed off so that it may not be connected with weld tab 56 of female terminal 49. In addition, start capacitor 195 is connected in parallel circuit relation with run capacitor 191, and another lead 197 is connected to electrical connector section 53 of female terminal 49 in electrical control 11 and led through a respective one of openings 99 therefor to the exterior of housing 13 so as to connect with start capacitor 195.

Referring again in general to the drawings and recapitulating at least in part with respect to the foregoing, an alternative method in one form of the invention for assembling or making electrical control 11 is performed generally in the same manner as the previously discussed making method with the exceptions noted below and utilizes the same component parts of the electrical control. While this alternative method meets at least some of the objects and advantageous features set out hereinbefore, it is believed that such alternative method may have indigenous objects and advantageous features which will be in part apparent and in part pointed out.

In this method, the component parts of electrical control may be assembled together in circuit relation with respect to the housing cover and base numbers 15, 17 with the exception that overload protector device 21 is not connected in circuit relation with contact member 29 at this time. Instead, overload protector device 21 is disposed in its assembled position within housing cover and base member 15, 17 with terminals 33, 35 of the overload protector device extending through openings 39, 40 therefor in the housing cover, and of course, terminal 33 is disposed adjacent welding tab 173 which also extends through opening 39. Thus, after housing cover and base 15, 17 have been interconnected with each other in their respective assembled positions, as previously described terminal 33 may be welded or otherwise suitably connected to tab 173 of contact member 29 from exteriorly of housing 13. Of course, the connection of contact member tab 173 and terminal 33 of overload protector device 21 may also be accomplished prior to the interconnection of housing cover and base 15, 17 in their respective assembled positions.

From the foregoing, it is now apparent that an improved method of making or assembling an electrical control is presented meeting the objects and advantageous features set out hereinbefore, and it is contemplated that changes as to the precise arrangements, shapes, details and connections of the components illustrated herein by way of disclosure as being merely representative, as well as the precise order of the steps of the illustrated method, may be made by those having ordinary skill in the art without departing from the spirit of the invention or the scope thereof as is set out in the claims which follow.

What we claim as new and desire to secure by Letters Patent of the United States is:

1. A method of making an electrical control having a pair of housing parts with at least a pair of openings in one of the housing parts and at least another opening in the other of the housing parts, and the electrical control also having a plurality of electrical components including at least a pair of female terminals, a solid state starter device having a PTCR interposed between a pair of contact plates, a relay device having coil means with an armature member adapted for magnetic coupling relation therewith, an overload protector device having at least a pair of terminal means, and a pair of contact members, the method comprising the steps of:
    (a) connecting the female terminals of the at least pair thereof with the coil means of the relay device and one of the contact plates of the starter device, respectively, and also connecting the contact members with the other of the contact plates of the starter device and with the coil means of the relay device and one terminal means of the at least pair thereof on the overload protector device, respectively;
    (b) mounting one of the contact members to the other housing part with the coil means of the relay device and the overload protector device connected to the one contact member and extending the other of the terminal means of the overload protector device through the another opening in the other housing part exteriorly thereof;
    (c) mounting the other of the contact members to the one housing part with the starter device and one of the female terminals of the at least pair thereof respectively connected to the other contact member and inserting the one female terminal into one of the openings of the at least pair thereof in the one housing part;
    (d) inserting the other female terminal of the at least pair thereof into the other of the openings of the at least pair thereof in the one housing part; and
    (e) assembling the one housing part and the other of the housing parts together so that the overload protector device and the starter device are positioned adjacent each other and so that the contact members are positioned for contacting engagement with the armature means in the coil means of the relay device.

2. A method of making an electrical control having a pair of housing parts, a starter device, a relay device having coil means and armature means adapted for magnetic coupling relation therewith, an overload protector device, and a pair of contact members, the method comprising the steps of:
    (a) mounting to one of the housing parts one of the contact members with the overload protector and the coil means respectively connected in circuit relation therewith;
    (b) mounting to the other of the housing parts the other of the contact members with the starter device connected in circuit relation therewith; and
    (c) assembling the housing parts together in an assembly position with the starter device and the overload protector disposed at least adjacent each other and with the contact members positioned for contacting engagement with the armature means of the relay device and caging the coil means of the relay device between the housing parts.

3. The method as set forth in claim 2 comprising the additional step of interconnecting the housings against displacement movement from the assembly position thereof.

4. The method as set forth in claim 3 wherein the interconnecting step includes heat sealing the housings together in the assembly position thereof.

5. The method as set forth in claim 2 wherein the first mounting step includes disposing the armature means of the relay device within at least a part of the coil means.

6. The method as set forth in claim 2 wherein the assembling and caging step includes seating the coil means in a pair of cradles respectively provided therefor on the housing parts.

7. The method as set forth in claim 2 wherein the second mounting step includes inserting into an opening in the other housing part a female terminal connected in circuit relation with the starter device.

8. The method as set forth in claim 2 wherein the assembling and caging step includes inserting into an opening in the one housing part a female terminal connected in circuit relation with the coil means.

* * * * *